United States Patent [19]
Iseman

[11] 3,933,054
[45] Jan. 20, 1976

[54] TOROIDAL TRACTION DRIVE

[75] Inventor: Walter J. Iseman, Monroe Center, Ill.

[73] Assignee: Sundstrand Corporation, Rockford, Ill.

[22] Filed: July 18, 1974

[21] Appl. No.: 489,466

[52] U.S. Cl. .................................................. 74/200
[51] Int. Cl.² .......................................... F16H 15/38
[58] Field of Search ............. 74/200, 796, 194, 201

[56] References Cited
UNITED STATES PATENTS

| | | | |
|---|---|---|---|
| 2,959,972 | 11/1960 | Madson | 74/200 |
| 2,962,909 | 12/1960 | Jaquith et al. | 74/200 |
| 3,165,937 | 1/1965 | Tomaszek | 74/200 |
| 3,345,882 | 10/1967 | Armstrong | 74/200 |
| 3,413,864 | 12/1968 | Magill et al. | 74/200 |

*Primary Examiner*—Samuel Scott
*Assistant Examiner*—Allan R. Burke
*Attorney, Agent, or Firm*—Wegner, Stellman, McCord, Wiles & Wood

[57] ABSTRACT

A toroidal traction drive with a pair of spaced discs having opposed annular grooves and mounted in the casing for independent but interrelated coaxial rotation, a plurality of rollers positioned between the discs for frictional engagement with both discs, independent hydraulic control means for shifting each of the rollers with respect to the discs for varying the drive ratio, and a plurality of fixed cam means associated, one with each of the rollers, for bringing the roller axis of each roller to an intersecting relation with the drive axis to establish a steady state condition for the drive.

10 Claims, 4 Drawing Figures

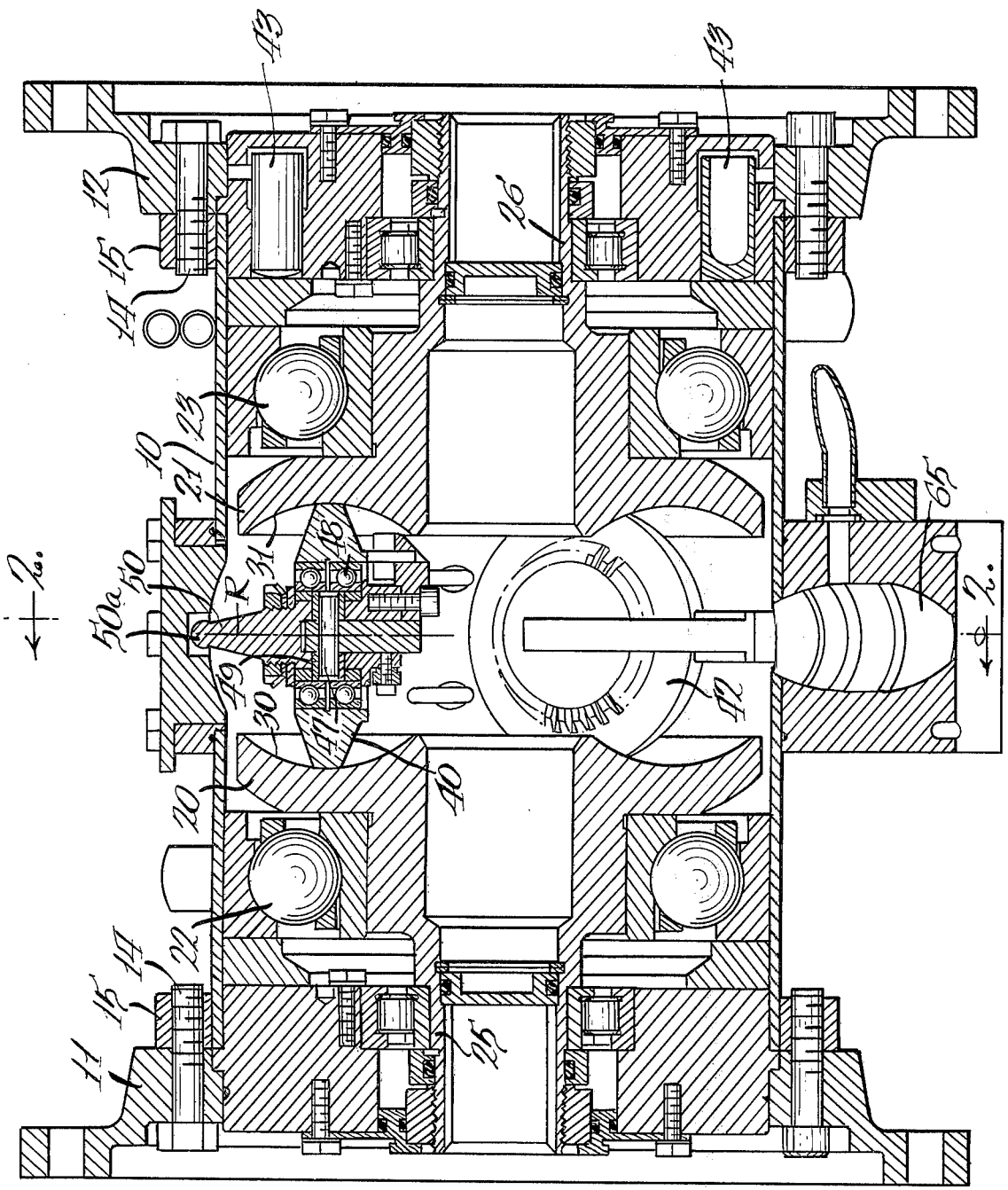

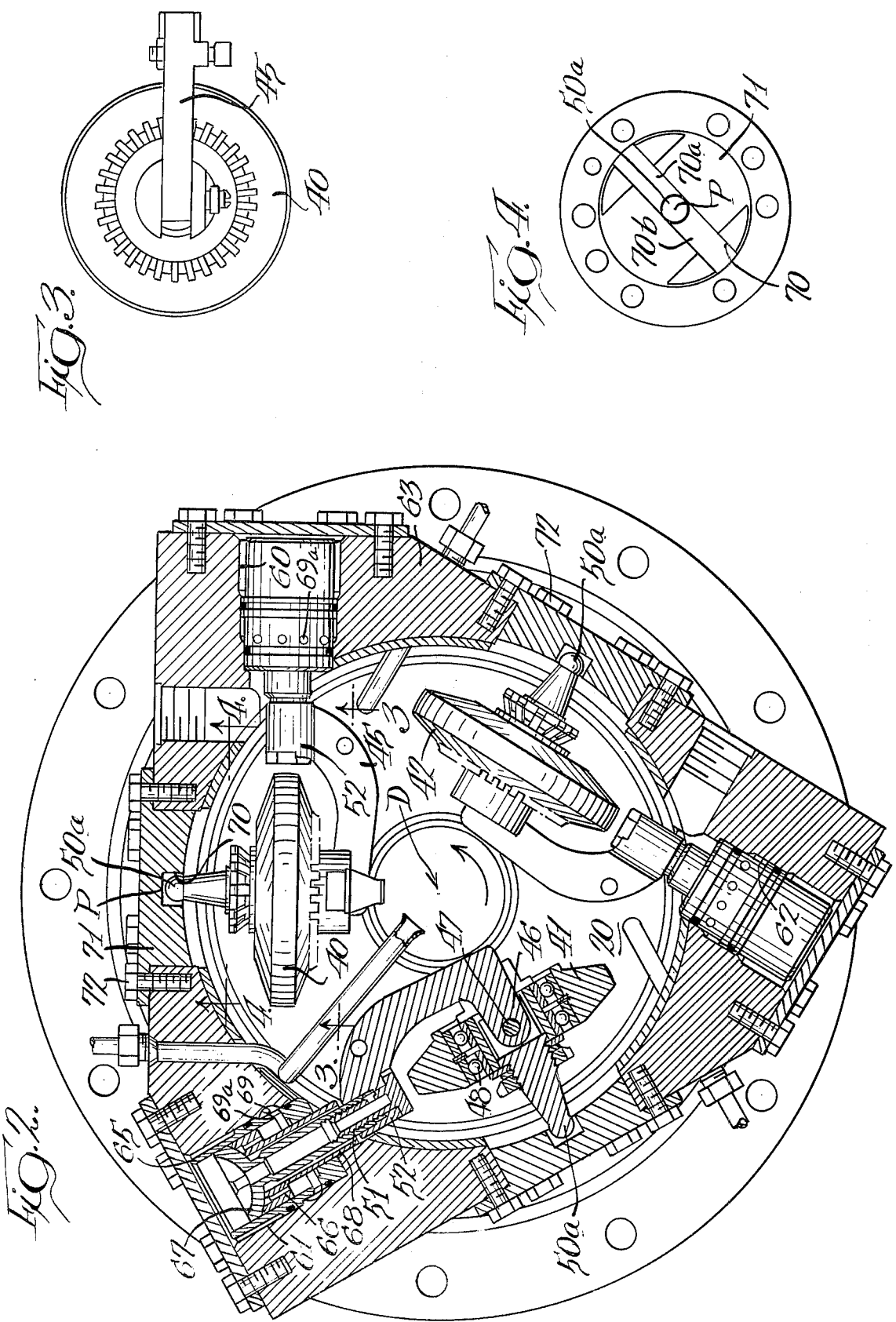

3,933,054

TOROIDAL TRACTION DRIVE

BACKGROUND OF THE INVENTION

This invention relates to a toroidal traction drive and, particularly, to such a mechanical drive whereby a control system may vary the drive ratio and, if desired, control the drive ratio whereby variable input speeds give a constant output speed from the drive.

Early work in the field of toroidal traction drives is shown in the Hayes U.S. Pat. Nos. 1,865,102 and 2,123,006. The patents describe the action of rollers between discs having annular grooves whereby tangential shift of the rollers results in rocking or precessing of the rollers to vary the drive ratio.

More recently, there has been published material with respect to a toroidal traction drive wherein a plurality of rollers are positioned between discs and with each roller mounted in a carrier. All the carriers are connected to a movable cam ring whereby movement of the cam ring causes movement of the rollers to vary the drive ratio. In such a device, all of the rollers are caused to be positioned through a common mechanical structure and, therefore, the positioning is subject to variations in the components of the mechanical structure.

The Magill et al. U.S. Pat. No. 3,413,864 discloses a toroidal traction drive wherein a plurality of drive rollers are each independently mounted and with hydraulic control means associated with each drive roller and acting on the roller in a manner to cause rocking of the drive rollers to vary the drive ratio.

An additional prior art patent is Armstrong U.S. Pat. No. 3,345,882 which discloses a toroidal traction drive wherein a plurality of drive rollers spaced between discs has fluid-operating devices associated with both ends of the roller mountings.

SUMMARY

A primary feature of the invention disclosed herein is to provide a new and improved toroidal traction drive wherein the drive rollers are simply mounted and each independently associated with hydraulic control means for obtaining load division equally between the drive rollers by shift of the drive rollers to a predetermined drive ratio position and with the rollers brought to equilibrium by cam means fixed to the casing of the drive which function to bring the roller axes into intersecting relation with the drive axis of the drive.

Another feature of the invention is to provide a toroidal traction drive wherein each of the drive rollers is mounted for rocking or precessing movement by pivotal mounting to an arm which is rotatably mounted on an extensible rod operated by the hydraulic control means and a cam follower extending coaxially to the roller axis engageable in an elongated cam slot having a midpoint coincident with the drive axis, and sections of the cam slot at either side of the midpoint extending at equal and opposite angles to the drive axis whereby rocking of the drive roller shifts the cam follower along one of the cam slot sections whereby the inclination thereof functions to bring the roller axis back into intersecting relation with the drive axis.

BRIEF DESCRIPTION OF THE DRAWINGS

FIG. 1 is a vertical central section taken longitudinally of the toroidal traction drive;

FIG. 2 is a vertical section, taken generally along the line 2—2 in FIG. 1;

FIG. 3 is a section, taken generally along the line 3—3 in FIG. 2; and

FIG. 4 is a section, taken generally along the line 4—4 in FIG. 2.

DESCRIPTION OF THE PREFERRED EMBODIMENT

The toroidal traction drive has a casing with a generally cylindrical shell 10 with a pair of end plates 11 and 12 fitted to opposite ends of the shell 10 and secured by threaded fastening members 14 to rings 15 suitably secured as by welding to the shell 10. A pair of spaced-apart discs 20 and 21 are positioned within the casing and are independently mounted for coaxial rotation about a drive axis D, indicated in FIG. 2, by respective bearings 22 and 23 supported by the casing shell 10. The disc 20, which may be a drive disc, has a cylindrical extension 25 extending through a central opening in the end plate 11 and splined for attachment to an input shaft (not shown). The disc 21, which may be a driven element, has a cylindrical extension 26 extending outwardly through the end plate 12 and is splined for connection to an output shaft (not shown). Each of the discs 20 and 21 has an annular groove 30 and 31, respectively, with each groove being part of a torus and partially circular in cross section, as seen in FIG. 1.

A plurality of drive rollers 40, 41, and 42 is positioned between the discs 20 and 21 and with the curved peripheral surface thereof in frictional engagement with the grooves of the discs whereby rotation of the disc 20 imparts rotation to the drive rollers about a roller axis R (FIG. 1) which, in turn, impart rotation to the driven disc 21. The rollers 40–42 each have a radius the same as that of the cross-sectional curvature of the grooves 30 and 31.

The bearing 23 is urged to the left in FIG. 1 by fluid pressure acting on pistons 43 to urge the disc 21 toward the disc 20 and squeeze the drive rollers 40–42 therebetween.

Each of the drive rollers 40–42 is mounted for movement tangentially of the grooves 30 and 31, which, through motion inherent in a toroidal drive and as explained in the aforesaid mentioned Hayes patents results in rocking or precessing of the drive roller to a position either clockwise or counterclockwise for roller 40, as shown in FIG. 1, to vary the drive ratio between the discs 20 and 21.

The rocking action for the structure disclosed herein results from a mounting and hydraulic control means for each of the drive rollers, with the structure for each drive roller being the same and described with respect to drive rollers 40 and 41 in FIGS. 1 and 2. The mounting of the drive rollers for rocking or precessing movement includes an arm 45 of a shape to have an end 46 thereof connected rotatably by a pin 47 to a drive roller. The pin 47 is rotatable within a sleeve 49 carried by a cam follower arm 50 fitted within an inner race of a bearing 48. The cam follower arm 50 extends outwardly of the drive roller along the drive roller axis R and terminates in a spherical end 50a. The opposite end 52 of each of the arms 45 is formed as a cylindrical sleeve for rotatable mounting on an extensible rod 51 having a rod axis extending longitudinally thereof and with the rod being extensible along said axis under the control of the hydraulic control means to be described. The rod axis of the rod 51 extends to intersect with the center of rotation of the drive roller associated therewith whereby movement of the extensible rod 51 along the rod axis functions to shift the associated drive roller generally tangentially of the grooves 30 and 31.

In a toroidal drive, this generally tangential movement of the drive rollers results in precessing or rocking movement of the drive rollers to vary the drive ratio between the discs 20 and 21. This rocking movement is permitted by rotation of the arm 45 about the rod axis of the rod 51.

The hydraulic control means for obtaining the position of the drive rollers includes the cavities 60, 61, and 62 formed in a casing part 63 secured around the shell intermediate its ends. Referring particularly to the hydraulic control means associated with the drive roller 41 and shown in detail in FIG. 2, the cavity 61 has a sleeve 65 fitted therein and with a piston 66 movable within the sleeve. The piston 66 has an outer face which is partly spherical to engage against a similarly-shaped partly spherical face of an end 67 of the rod 51. The rod 51 extends through the center of the piston 66 and the piston has a tubular extension 68 extended through the base of the sleeve 65.

With the drive disc 20 rotating counterclockwise, as shown in FIG. 2, tangential load forces on a roller by frictional contact tend to move the drive roller 41 and the mounting arm 45 therefor downwardly, as viewed in FIG. 2, to move the piston 66 toward the lower end of the cylinder sleeve 65. The actual position of the piston 66 and, therefore, of the extensible rod 51 operatively connected thereto through the spherical connection between the piston 66 and the rod end 67 is controlled by the value of control pressure supplied within the cylinder sleeve to act upwardly against the lower side of the piston 66. This control pressure is supplied through passage means including a groove 69 through openings 69a in the wall of the sleeve 65 whereby control pressure is applied to the underside of the piston 66. Thus, the value of the pressure supplied to the hydraulic control means determines, in opposition to the forces resulting from rotation of the toroidal traction drive, the position of the drive rollers at a location generally tangentially of the grooves 30 and 31 to obtain a precessed position of the drive rollers for a desired drive ratio.

A portion of the cavity 61, at the outermost end thereof, communicates across the end of the cylindrical sleeve 65 with the cylinder interior whereby charge pressure at a value less than control pressure may act on the outer end 67 of the rod and maintain the rod end 67 in contact with the coacting spherical surface of the piston 66.

As stated previously, the hydraulic control means for each of the drive rollers is identical and with the common application of control pressure thereto an equal shift of the drive rollers results for equal loading thereof in transmitting the drive from the disc 20 to the disc 21.

In order to have any single discrete position of the control piston 66 of the hydraulic control means and, therefore, of the rod 51 provide a specific drive ratio for the toroidal traction drive, it is necessary to bring the precessed drive rollers to a steady state condition wherein the roller axis R extends into intersecting relation with the drive axis D. This function is accomplished by cam means including the cam followers 50 extending outwardly from the drive rollers along the axes R. The cam means includes a cam associated with each drive roller and fixed to the casing shell 10. The cam is in the form of a slot or groove 70 formed in a block 71 and secured to the casing part 63 by fastening elements 72. With the block 71 assembled to the casing as shown in FIGS. 1 and 2, the cam slot 70 faces inwardly and has a pair of side walls closely adjacent to the spherical end 50a of the cam follower. The cam slot 70 has a midpoint P in line with the drive axis D whereby when the drive rollers are horizontal, as shown by drive roller 40 in FIG. 1, the cam follower 50 has a position with the roller axis R radially directed into intersecting relation with the drive axis D. Sections 70a and 70b (FIG. 4) of the cam slot extend at equal and opposite angles relative to the drive axis D whereby as the drive rollers precess to a new drive ratio setting, the spherical end 50a of each roller cam follower moves along either of the sections 70a or 70b to pivot the cam follower and, therefore, the drive roller about the axis of the mounting pin 47 to bring the roller axis R back into intersecting relation with the drive axis D.

In operation, and referring initially to FIG. 2, if the roller 40 is shifted tangentially of the drive disc 20 responsive to fluid pressure, for example, in a direction toward the right in FIG. 2, and the disc 20 is rotating in a counterclockwise direction, the axis of the roller 40 will be moved to a position where it no longer intersects the axis D. Since the roller axis is anchored at the spherical end 50a, the roller axis will be pivotedly inclined relative to spherical end 50a. The roller 40 will no longer be tangent to the disc 20, and at the place where the roller and disc engage each other, the two surfaces must move in exactly the same direction if slippage at the contacts is to be prevented but the velocity vectors for rotation of each member about its axis are not congruent. Thus, there will be a component of velocity and a resultant frictional force (see bh in FIG. 8 of Hayes U.S. Pat. No. 1,865,102), which tends to pivot the roller about the rod 51 outwardly on the driving disc 20 and inwardly on the driven disc. Pivotal movement of the roller responsive to such frictional force establishes a drive ratio which is different from one to one, and the speed of the driven disc will be increased relative to the speed of the input.

The movement of the roller 40 about the axis of rod 51 to change the drive ratio also results in motion of the cam follower spherical end 50a along the inclined cam slot 70 in a manner to return the axis of the roller to intersect the axis D in a steady state condition. That is, the pivotal movement of the roller about axis 40 produces motion of spherical end 50a along slot portion 70a, and the roller axis moves to a position intersecting axis D.

With the structure disclosed herein, a common control pressure may be applied to the hydraulic control means associated one with each of the drive rollers whereby the application of equal pressure results in positioning of the drive rollers for equal load division therebetween and with the fixed cam slots coacting with the cam followers associated with the rollers to assure a specific drive ratio for each discrete position established by the hydraulic control means.

I claim:

1. A toroidal traction drive comprising a casing, a pair of spaced discs with toroidal grooves mounted in said casing for independent coaxial rotation about a drive axis, a plurality of rollers positioned between said discs and with each roller rotatable about a roller axis and in rolling frictional engagement with both of said grooves, means independently mounting each of said rollers for rocking movement including an arm for each roller and an extensible rod movable linearly along a rod axis intersecting a roller axis and with the arm mounted on said rod for rotation about said rod axis to tilt the roller axis and determine the locations of engagement of the roller with said grooves, and means for maintaining all of the roller axes directed to intersecting relation with said drive axis in all positions of the rollers including a cam follower extending axially of each roller and a plurality of elongate cams fixed to the casing and associated one with each of said cam followers.

2. A toroidal traction drive as defined in claim 1 including a hydraulically operable piston associated one with each extensible rod for positioning the rod and the associated roller.

3. A toroidal traction drive as defined in claim 2 wherein each of said elongate cams comprises a slot receiving the associated cam follower and said slot having a length with a midpoint in line with the drive axis and sections at either side of said midpoint extending at equal and opposite angles to said drive axis whereby a roller in a position normal to the grooves has the associated cam follower at said midpoint and with rocking of a roller causing movement of the associated cam follower along one of said cam slot sections to direct the roller axis toward the drive axis.

4. A toroidal traction drive comprising a casing, a pair of spaced discs with toroidal grooves mounted in said casing for independent coaxial rotation about a drive axis, a plurality of rollers positioned between said discs and with each roller rotatable about a roller axis and in rolling frictional engagement with both of said grooves, means independently mounting each of said rollers for rocking movement to tilt the roller axis and determine the locations of engagement of the roller with said grooves, means for maintaining all of the roller axes directed to intersecting relation with said drive axis in all positions of the rollers including a cam follower extending axially of each roller and a plurality of elongate cams fixed to the casing and associated one with each of said cam followers, and a plurality of hydraulically operated pistons associated one with each of said rollers and a rod extending therefrom which is positionable along a rod axis, and said means mounting a roller for rocking movement includes an arm carrying a roller and mounted on said rod for rotation about the rod axis.

5. A toroidal traction device as defined in claim 4 including a part-spherical joint connecting said piston to said rod to permit shift of said rod relative to the piston.

6. A toroidal traction drive as defined in claim 5 including passage means for applying fluid pressure to the piston in opposition to a tangential load force exerted on a roller by frictional contact with said discs, and passage means for directing a fluid pressure against a section of said part-spherical joint sufficient to maintain the sections of the spherical joint in engagement.

7. A toroidal traction drive comprising a casing, a pair of spaced discs with grooves mounted in said casing for independent coaxial rotation about a drive axis and each groove having a partially circular cross section, a plurality of rollers positioned between said discs and with each roller rotatable about a roller axis and in rolling frictional enagement with both of said grooves, means independently mounting each of said rollers for adjustment tangentially of said grooves to result in rocking movement to tilt the roller axis and determine the locations of engagement of the roller with said grooves, an additional pivot axis for said rollers normal to said roller axis, a plurality of fluid operated pistons associated one with each of said rollers for adjusting said rollers tangentially, and means for maintaining all of the roller axes directed toward said drive axis in all positions of the rollers by movement about said additional pivot axis including a cam follower extending axially of each roller and a plurality of elongate cams fixed to the casing and each having a cam slot extending in the direction of and at an angle to said drive axis to receive a cam follower.

8. A toroidal traction drive as defined in claim 7 including an extensible rod connected to a piston and movable along a rod axis which extends into intersection with the center of a roller, and said mounting means includes an arm pivotally mounted on said rod for rotation about said rod axis and means interconnecting said arm to the roller at the roller center including pivot means whereby the roller can pivot about said additional pivot axis normal to said roller axis to have said roller axis point toward the drive axis.

9. A toroidal traction drive as defined in claim 8 wherein each of said elongate cam slots has a length with a midpoint in line with the drive axis and sections at either side of said midpoint extending at equal and opposite angles to said drive axis whereby a roller in a position normal to the grooves has the associated cam follower at said midpoint and with tangential advance of a roller and resulting rocking of a roller causing movement of the associated cam follower along one of said cam slot sections to direct the roller axis toward the drive axis.

10. A traction drive comprising,
a casing,
a pair of spaced discs coaxially mounted in the casing for independent rotation about a drive axis and each having a partially toroidal groove,
a plurality of angularly spaced rollers positioned between said discs, each rotatable about a roller axis and in rolling frictional engagement with both of said grooves,
reciprocal means independently mounting each of said rollers for adjustment along an axis extending tangentially of said grooves normal to the roller axis,
each reciprocal means including an arm mounted for rocking movement about the tangential axis to adjust the contact of the roller radially relative to the discs,
means mounting each roller on the associated arm for pivotal movement about a fourth axis normal to the roller axis and tangential axis and parallel to the drive axis when the roller engages both discs equidistant from the drive axis, and
means for maintaining the roller axis intersecting the drive axis.

* * * * *